(12) United States Patent
Ahmad Hambaly et al.

(10) Patent No.: US 11,636,674 B2
(45) Date of Patent: Apr. 25, 2023

(54) SYSTEM AND METHOD FOR VIRTUAL ASSISTANT SITUATION COMMENTARY

(71) Applicant: MOTOROLA SOLUTIONS, INC., Chicago, IL (US)

(72) Inventors: Alfy Merican Ahmad Hambaly, Bayan Baru (MY); Hasrolnizam Mohd Mokhtar, Teluk Intan (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 365 days.

(21) Appl. No.: 16/683,369

(22) Filed: Nov. 14, 2019

(65) Prior Publication Data
US 2021/0150211 A1 May 20, 2021

(51) Int. Cl.
| | |
|---|---|
| *G06V 20/20* | (2022.01) |
| *H04N 7/18* | (2006.01) |
| *G10L 25/78* | (2013.01) |
| *G10L 15/24* | (2013.01) |
| *G10L 15/22* | (2006.01) |
| *G06F 3/16* | (2006.01) |
| *G10L 25/93* | (2013.01) |

(52) U.S. Cl.
CPC ............ *G06V 20/20* (2022.01); *G06F 3/165* (2013.01); *G10L 15/22* (2013.01); *G10L 15/24* (2013.01); *G10L 25/78* (2013.01); *G10L 25/93* (2013.01); *H04N 7/183* (2013.01)

(58) Field of Classification Search
CPC ............ G06K 9/00671; G06K 9/0063; G06K 9/469; G06K 9/00771; G06F 3/165; G06F 16/7837; G06F 16/784; G06F 16/738; G06F 16/78; G06F 3/048; G06F 3/04815; G10L 15/22; G10L 15/24; G10L 25/78; G10L 25/93; A63F 13/60; A63F 13/48; A63F 13/795; A63F 13/352; A63F 13/10; H04N 5/2621; G06T 7/00; H04M 3/5183; H04M 3/51; H04M 3/42068; H04M 3/5108; H04M 1/236; H04M 1/72594; H04M 11/045
USPC ......... 348/158; 345/419, 473, 467; 704/257; 700/94
See application file for complete search history.

(56) References Cited

U.S. PATENT DOCUMENTS

| | | | | |
|---|---|---|---|---|
| 9,111,545 | B2* | 8/2015 | Jadhav | G10L 21/06 |
| 9,307,073 | B2* | 4/2016 | Maxwell | H04M 3/5183 |
| 2007/0273696 | A1* | 11/2007 | Cheng | G06K 9/469 |
| | | | | 345/467 |

(Continued)

*Primary Examiner* — John W Miller
*Assistant Examiner* — Sean N. Haiem

(57) ABSTRACT

Techniques for virtual assistant situation commentary are provided. At least one image frame of a field of view (FOV) of a camera may be received, the at least one image frame intended to be sent to at least one participant of a talk group. A description associated with each element of a plurality of elements within the FOV of the camera may be generated. It may be determined that the at least one participant of the talk group is not currently visually engaged. Audio communication of a sender of the at least one image frame may be monitored to identify a reference to an element of the plurality of elements. The audio communication may be supplemented to include portions of the description of the element that were not included in the audio communication from the sender when it is determined that the at least one participant is not visually engaged.

18 Claims, 4 Drawing Sheets

(56) References Cited

U.S. PATENT DOCUMENTS

| | | | | |
|---|---|---|---|---|
| 2013/0083036 | A1* | 4/2013 | Cario | A63F 13/60 |
| | | | | 345/473 |
| 2013/0151248 | A1* | 6/2013 | Baker, IV | G10L 25/51 |
| | | | | 704/228 |
| 2015/0189071 | A1* | 7/2015 | Maxwell | H04M 3/42068 |
| | | | | 455/414.1 |
| 2015/0221299 | A1* | 8/2015 | Matula | G10L 25/48 |
| | | | | 704/249 |
| 2015/0331660 | A1* | 11/2015 | Kalampoukas | G10L 25/27 |
| | | | | 700/94 |
| 2015/0348570 | A1* | 12/2015 | Feast | G06Q 10/0639 |
| | | | | 704/270 |
| 2017/0300150 | A1* | 10/2017 | Choe | G06F 16/7837 |
| 2018/0107341 | A1* | 4/2018 | Aurongzeb | G06F 3/0425 |
| 2018/0145934 | A1* | 5/2018 | Pappu | H04L 12/1822 |
| 2018/0293221 | A1* | 10/2018 | Finkelstein | G10L 17/10 |
| 2020/0175961 | A1* | 6/2020 | Thomson | G10L 15/063 |

* cited by examiner

SYSTEM AND METHOD FOR VIRTUAL ASSISTANT SITUATION COMMENTARY

BACKGROUND

The communications capabilities of public safety first responders have historically been limited to voice communications. A public safety first responder may be equipped with a Land Mobile Radio (LMR) walkie talkie (or similar form factor) that allows for voice communication with other first responders and/or other public safety personnel. In some cases, those communications capabilities may have included rudimentary data capabilities (e.g. low bandwidth text messages, etc.).

More recently, the communications capabilities of first responders has drastically increased. In addition to traditional low bandwidth LMR devices, first responders may also carry broadband devices, such as devices that operate on Long Term Evolution (LTE) networks, such as smartphones. Such devices may include the ability to capture and send images and video. The devices may also include screens that may be used to display images and video that is received from others, including other first responders. In some cases, converged devices that include both LMR and LTE capabilities may be utilized. In addition, many first responders may also be equipped with standalone video capture devices, such as body worn cameras. Those devices may be equipped with communications capabilities or may utilize the communications capabilities of other devices in order to send still images or video.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
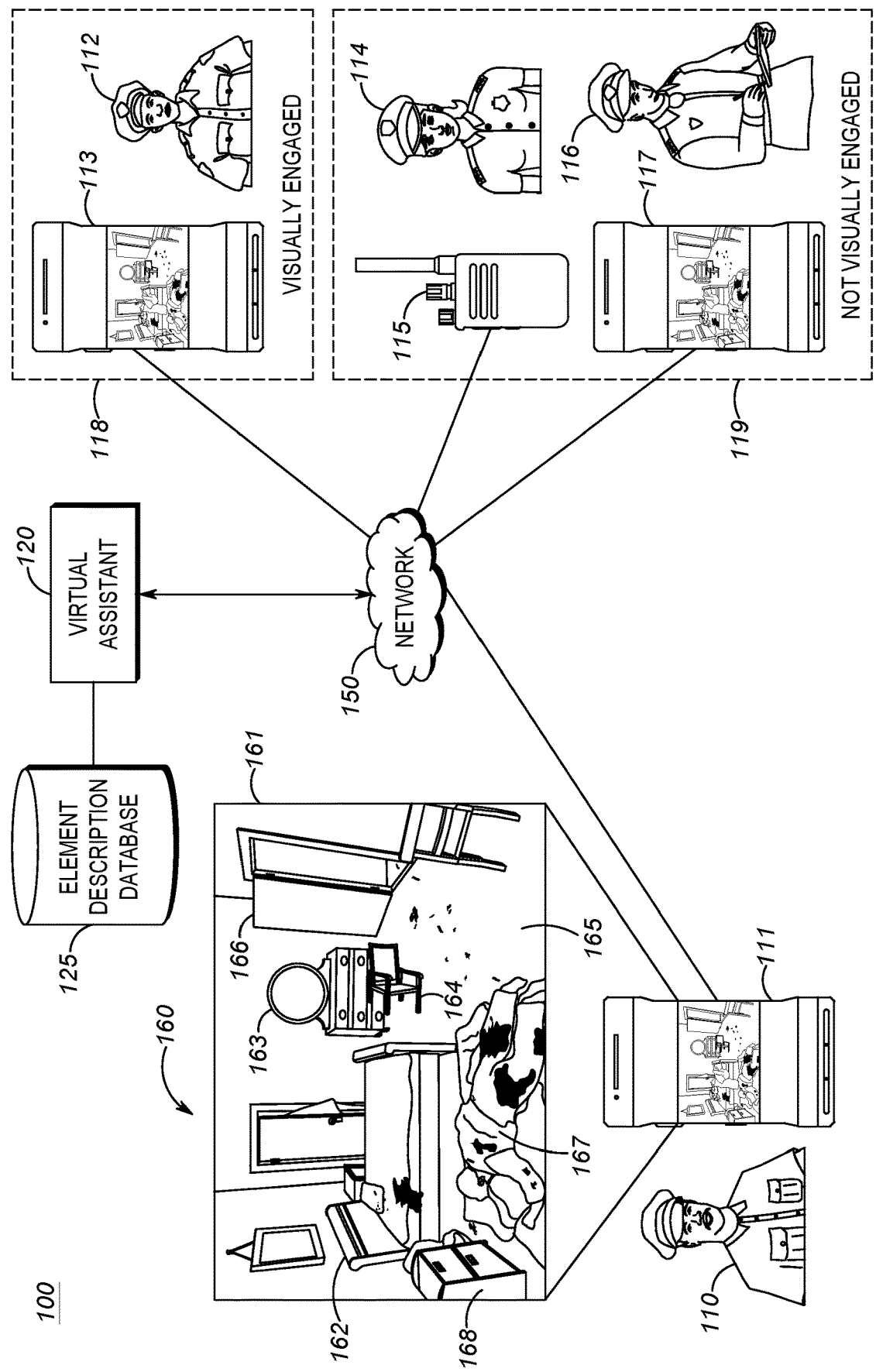
FIG. 1 is an example environment that may utilize the virtual assistant situation commentary techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The ability of modern first responder communications devices to convey rich multimedia, such as photographs and videos, has tremendously improved the capabilities of public safety personnel. For example, when responding to the scene of an incident, first responders may be able to send video of the incident to colleagues who have not yet arrived on scene or who may be remotely located (e.g. supervisor located at the station house, etc.). Thus, the first responder is able to provide visual information to others without having to audibly describe the scene his communications device is capturing.

Although the ability to transmit media, such as still frame images and video has tremendously increased the capabilities of public safety personnel, problems may arise. For example, although an agency may intend to equip all personnel with modern devices that include the ability to receive images, the process may be gradual. For example, budget constraints may only allow for a small number of first responder communications devices to be upgraded per year. As a result, an agency may utilize a mix of devices, some which include visual display capabilities and some which do not.

A problem may arise when a responder is sending visual information, but not all recipients utilize devices capable of displaying visual information. Recipients that utilize devices that include visual capabilities are able to see what the officer is sending and thus may not require further explanation of what is present in the scene, because they are able to see it themselves. On the other hand, recipients who do not utilize devices with visual display capabilities may be confused because they cannot see the visual information being sent. It should also be understood that the same confusion may arise with recipients whose devices include visual display capabilities, but who happen to not be looking at the display on their device. For example, recipients may be occupied with other tasks that prevent the recipient from looking at the screen of their device (i.e. operating in an "eyes up" mode, occupied with other tasks, etc.).

The techniques described herein overcome these problems individually and collectively. A virtual assistant may monitor the visual information that is being sent by a first responder and generate a description of the elements within the field of view of the image capture device. The virtual assistant may monitor audio data sent by the first responder in conjunction with the visual information. The virtual assistant may identify a reference to an element in the audio data. The virtual assistant may then insert the generated description when it detects a period of silence in the audio transmission in order to generate supplemented audio. Recipients who are visually engaged (e.g. utilizing a device with a display screen that they are currently looking at) will receive the original audio stream. Recipients who are not visually engaged (e.g, using a device without display capabilities, not currently viewing the device screen, etc.) may receive the supplemented audio.

For example, consider the case of a first responder responding to a traffic accident involving two cars who is streaming video of the accident scene to others. The virtual assistant may identify two elements, the first and second cars. The virtual assistant may generate a description of each car based on the FOV of the scene being captured (e.g. Car: Red, Toyota, License Plate XXX123, Car: Black, Ford, License Plate 321YYY). The first responder may then share this visual data with other public safety personnel (e.g. a talk group). For example, the first responder may send the visual information while also transmitting audio information, such as, "I am sending you video of the car accident." For users who are visually engaged, they will receive the visual information and audio information as it was sent. Because they are able to see the visual information, there is no need to further describe the type of vehicles or the license plates.

The virtual assistant may determine if there are any recipients that are not visually engaged. For those recipients, the virtual assistant may generate and insert supplemented audio during periods of silence. The supplemented audio may include further description of the video that is being sent, but is not being received/viewed by the recipient. Continuing with the present example, the first responder may say, "I am sending you video of the car accident." The virtual assistant may recognize a reference to the identified element of "car" in the first responder's audio stream. The virtual assistant may detect silence in the audio transmission of the first responder and generate supplemental audio, such as, "One Car is Red, Toyota, License Plate XXX123, One Car is Black, Ford, License Plate 321YYY." The supplemental audio may be sent to those recipients that are not visually engaged.

A method is provided. The method may comprise receiving at least one image frame of a field of view (FOV) of a camera, the at least one image frame intended to be sent to at least one participant of a talk group. The method may further comprise generating a description associated with each element of a plurality of elements within the FOV of the camera. The method may further comprise determining that the at least one participant of the talk group is not currently visually engaged. The method may further comprise monitoring audio communication of a sender of the at least one image frame to identify a reference to an element of the plurality of elements. The method may further comprise supplementing the audio communication to include portions of the description of the element that were not included in the audio communication from the sender when it is determined that the at least one participant of the talk group is not currently visually engaged.

In one aspect, the at least one image frame of the FOV of the camera may further comprise a streamed video. In one aspect, supplementing the audio may further comprise detecting periods of silence within the audio communication from the sender and inserting the portions of the description of the element during the periods of silence. In one aspect, the method may further comprise detecting the sender has begun speaking again and discontinuing inserting the portions of the description of the element.

In one aspect, the method may further comprise suppressing the supplemented audio communication when the at least one participant of the talk group is currently visually engaged. In one aspect, determining that the at least one participant of the talk group is not currently visually engaged may further comprise at least one of determining the at least one participant of the talk group is using a device that is not equipped to display the at least one image frame and determining the at least one participant of the talk group is not currently viewing the at least one image frame.

A system is provided. The system may include a processor and a memory coupled to the processor. The memory may contain thereon a set of instructions that when executed by the processor cause the processor to receive at least one image frame of a field of view (FOV) of a camera, the at least one image frame intended to be sent to at least one participant of a talk group. The instructions may further cause the processor to generate a description associated with each element of a plurality of elements within the FOV of the camera. The instructions may further cause the processor to determine that the at least one participant of the talk group is not currently visually engaged. The instructions may further cause the processor to monitor audio communication of a sender of the at least one image frame to identify a reference to an element of the plurality of elements. The instructions may further cause the processor to supplement the audio communication to include portions of the description of the element that were not included in the audio communication from the sender when it is determined that the at least one participant of the talk group is not currently visually engaged.

In one aspect the at least one image frame of the FOV of the camera further comprises a streamed video. In one aspect, the instructions to supplement the audio may further comprise instructions to detect periods of silence within the audio communication from the sender and insert the portions of the description of the element during the periods of silence. In one aspect, the instructions may further cause the processor to detect the sender has begun speaking again and discontinue inserting the portions of the description of the element.

In one aspect, the instructions may further cause the processor to suppress the supplemented audio communication when the at least one participant of the talk group is currently visually engaged. In one aspect, the instructions to determine that the at least one participant of the talk group is not currently visually engaged may further comprise at least one of instructions to determine the at least one participant of the talk group is using a device that is not equipped to display the at least one image frame and determine the at least one participant of the talk group is not currently viewing the at least one image frame.

A non-transitory processor readable medium containing a set of instructions thereon is provided. When executed by a processor the instructions may cause the processor to receive at least one image frame of a field of view (FOV) of a camera, the at least one image frame intended to be sent to at least one participant of a talk group. The instructions may further cause the processor to generate a description associated with each element of a plurality of elements within the FOV of the camera. The instructions may further cause the processor to determine that the at least one participant of the talk group is not currently visually engaged. The instructions may further cause the processor to monitor audio communication of a sender of the at least one image frame to identify a reference to an element of the plurality of elements. The instructions may further cause the processor to supplement the audio communication to include portions of the description of the element that were not included in the audio communication from the sender when it is determined that the at least one participant of the talk group is not currently visually engaged.

In one aspect, the at least one image frame of the FOV of the camera further comprises a streamed video. In one aspect, the instructions to supplement the audio may further comprise instructions to detect periods of silence within the audio communication from the sender and insert the portions of the description of the element during the periods of silence. In one aspect, the instructions contained on the medium may further cause the processor to detect the sender has begun speaking again and discontinue inserting the portions of the description of the element.

In one aspect, the instructions contained on the medium may further cause the processor to suppress the supplemented audio communication when the at least one participant of the talk group is currently visually engaged. In one aspect, the instructions contained on the medium to determine that the at least one participant of the talk group is not currently visually engaged may further comprise at least one of instructions to determine the at least one participant of the talk group is using a device that is not equipped to display the at least one image frame and determine the at least one participant of the talk group is not currently viewing the at least one image frame.

FIG. 1 is an example environment that may utilize the virtual assistant situation commentary techniques described herein. Environment 100 may include an on scene responder 110 with an associated communications device 111, remote recipients 112, 114, 116 each associated with communications devices 113, 115, 117 respectively, a virtual assistant device 120, an element description database 125, and a network 150.

On scene responder 110 may be a member of a public safety organization that is tasked with responding to incidents. Example responders may include police, fire, emergency medical services (EMS), etc. In general, an on scene responder may be an individual that is dispatched to an incident location to physically handle an incident. The on scene first responder may be equipped with a communications device 111. In the context of the present disclosure, the on scene first responder is equipped with a communications device that is capable of sending visual images (e.g. still frames, stored video, streaming video, etc.). For ease of description, the remainder of the disclosure will refer to visual images as streaming video or video. It should be understood that this is for ease of description only and is not intended to imply that the techniques are intended to exclude visual still frame images.

It should be further understood that although shown as a single device, communications device 111 may actually be a combination of the functionality of one or more devices. For example, communications device 111 may be a single device, such as a smart phone, that includes a camera as well as broadband communications capabilities. Communications device 111 may be a standalone camera, such as a body worn camera, that is coupled to another device (e.g. LMR walkie talkie, smartphone, etc.) that provides wireless communications capabilities. What should be understood is that communications device 111 has the ability to capture video and transmit that video to others.

For example, communications device 111 may utilize network 150 to communicate video to various recipients. Communication device may also use network 150 to communicate audio information from responder 110. The techniques described herein are not limited to any particular form of communications network. The network may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the network may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the network may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. The techniques described herein are not limited to any particular type of network, and any network that allows the responder 110 to transmit audio and video to other responders would be suitable for use with the techniques described herein.

The environment 100 may also include remote recipients 112, 114, 116. Remote recipients may be other public safety personnel that may receive the audio and video communications from responder 110. For example, the remote recipients may be responders who are on their way to an incident scene or other who may need to be kept aware of what is going on at an incident scene (e.g. supervisors, shift commanders, agency head, etc.). What should be understood is that remote recipients 112, 114, and 116 may be personnel that responder 110 wishes to communicate with.

Each of remote recipients 112, 114, 116 may be associated with a communications device 113, 115, 117 and each of those communications devices may have different capabilities. For example, communications devices 113 and 117 may include a display screen, such that video may be received and displayed. For example, communications devices may be a smartphone or a converged device. What should be understood is that communications devices 113, 117 are capable of providing visual information to their respective users. In contrast, communications device 115 may be a device that lacks a display screen that is capable of displaying visual images, such as those produced by communications device 111. For example, communications device 115 may be a tradition LMR walkie talkie with only rudimentary display capabilities that do not include display visual images such as still frame photographs or video.

In the example environment 100, remote recipient 112 may be categorized as visually engaged 118. Visually engaged means that remote recipient 112 is in possession of a communications device 113 that is capable of receiving video. Furthermore, being visually engaged also includes that the recipient is viewing the display screen. There are many known techniques to determine if a user is engaged with a display screen (e.g. eye gaze detection, screen interaction detection, device position detection, screen powered on detection, etc.). The techniques described herein are not dependent on any particular technique to determine if a user is viewing a display screen.

Conversely, remote recipients 114, 116 may be categorized as being not visually engaged 119. For example, in the case of remote recipient 114, the associated device 115 is not capable of receiving video, and as such, remote recipient 114 can never be visual engaged. Remote recipient 116 may be associated with a device 117 that can receive video, but may be currently engaged in a task that prevents him from viewing the display screen (e.g. writing a ticket, etc.). The same techniques that are used to determine if a user is viewing a display screen may also be utilized to determine if a user is not viewing a display screen.

What should be understood is that a visually engaged 118 recipient is one who is not only capable of but is actually viewing received video. Conversely, a not visually engaged 119 recipient is one that is not viewing video, either because they are not in possession of a device capable of receiving video or that that they are not paying attention to the received video.

Environment 100 may also include virtual assistant 120 coupled with element description database 125 and connected to network 150. As will be described in further detail below, virtual assistant may monitor video sent from the communication device 111 of responder 110. The virtual assistant may identify elements within the video and store a reference to the identified element in the element description database 125. The virtual assistant may also utilize automated video description algorithms to generate descriptions of those identified elements and store those descriptions in the element description database. Use of the element description database is described in further detail below.

In an example of operation of environment 100, responder 110 may arrive at incident scene 160. For example, incident scene 160 may be a bedroom in a residence where some type of altercation has occurred. The incident scene may include several elements. For example, the incident scene is a room 161 and may include a bed 162, a dresser 163, a chair 164, a floor 165, a door to an adjoining room 166, a dead body 167, and a nightstand 168. The responder may use his communication device 111 to attempt to send a video of the incident scene 160 to remote recipients 112, 114, 116 via network 150.

Virtual assistant 120 may also receive the video sent by communications device 111. Virtual assistant 120 may utilize known automated video description techniques to analyze the video of the incident scene sent by communications device 111 to identify the elements contained in the video. For example, the room 161, the bed 162, the dresser 163, the chair 164, the floor 165, the door to an adjoining room 166, the dead body 167, and the nightstand 168. Virtual assistant 120 may create an entry in element description data base 125 for each identified element.

Furthermore, the virtual assistant 120 may utilize the known automated visual description techniques to generate more detailed descriptions of the identified elements. For example, for room element 161, the presence of a bed 162 may indicate that the room is a bedroom. The dresser 163 may be described as having an attached mirror. The chair may be described as being overturned, indicating signs of a struggle, when viewed in context of the entire image scene. The floor 165 may be described as having blood stains. The door to adjoining room 166 may be described as having a blood trail leading to it. The dead body 167 may be described as being on the floor and having blood stains. The nightstand 168 may be described as having two drawers. Table 1 lists the example elements identified by the virtual assistant as well as the generated description.

TABLE 1

| Element | Description |
| --- | --- |
| Bed | White sheets |
| Bedroom | Chair overturned, sign of struggle |
| Dresser | Attached mirror |
| Chair | Overturned, sign of struggle |
| Floor | Dead Body on Floor |
| Adjoining room | Blood train leading to adjoining room |
| Dead Body | Male, on floor, blood stains |
| Night Stand | Two Drawers |

Further operation of environment 100 will be described in more detail with respect to FIG. 2. Although the description above has utilized, as an example, relatively sophisticated techniques for identifying elements in a scene and providing a description of those elements, it should be understood that the techniques described herein are not so limited. What should be understood is that known element identification techniques may be used to generate the element description database. For example, in a simpler case, it is known to detect vehicles in an image and automatic license plate reader technology can identify license plates on those vehicles. Any techniques that identifies elements in an image and then generates a description of those elements may be utilized with the techniques described herein, and the techniques described herein are not limited to any particular technique of element identification and description.

Figure 2:
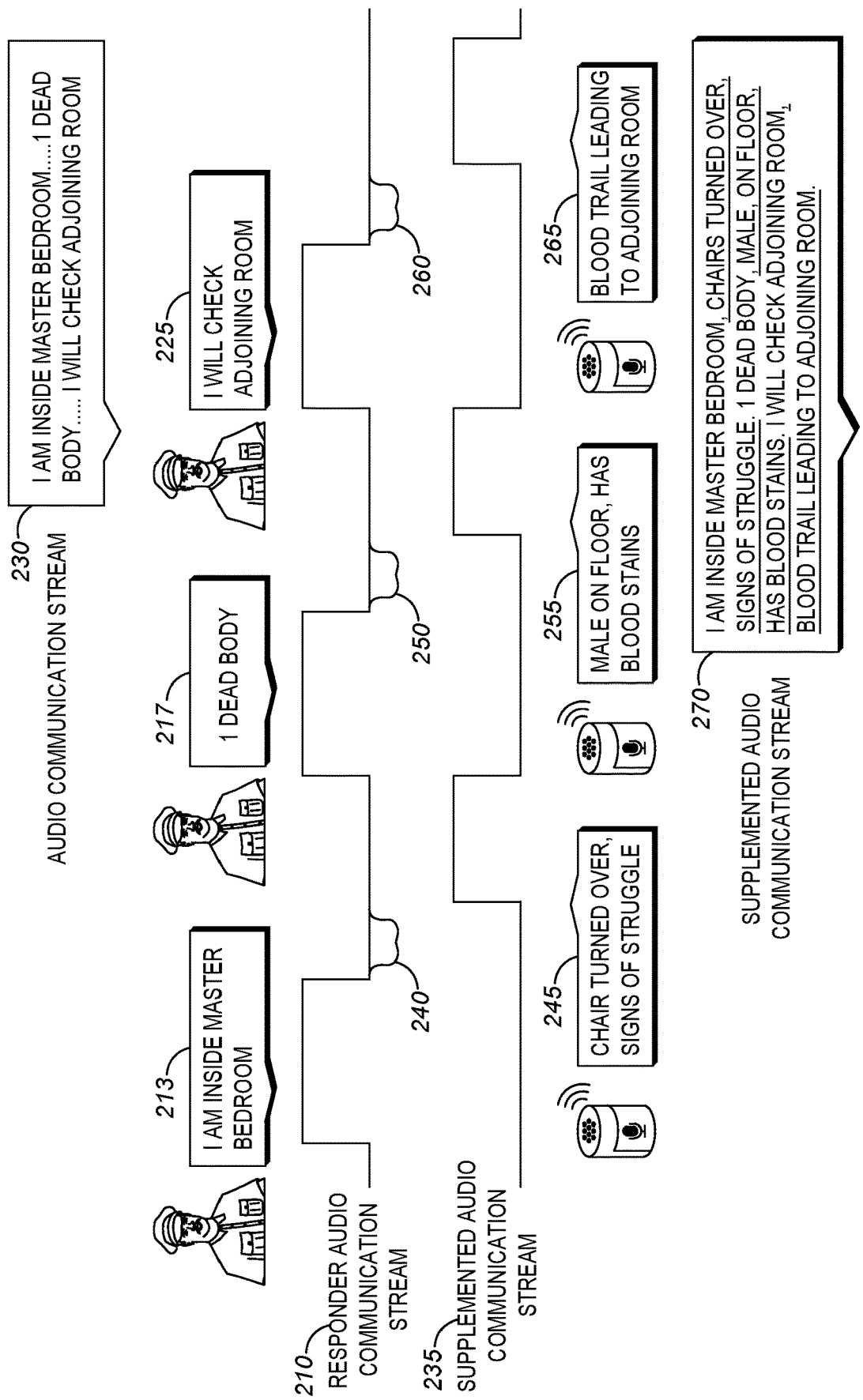
FIG. 2 is an example of a virtual assistant providing situation commentary according to techniques described herein.

FIG. 2 is an example of a virtual assistant providing situation commentary according to techniques described herein. In operation, responder 110 may send video of incident scene 160 to recipients 112, 114, 116. In addition, responder 110 may also send an audio communication stream to the recipients (e.g. describing the scene, what he is doing, etc.). For example, as shown, responder 110 may utilize his communications device to tell the recipients "I am inside master bedroom" 213. After a period of silence, the responder may communicate, "1 dead body" 217. After another period of silence, the responder may say, "I will check adjoining room" 225.

For visually engaged recipients 118, who are concurrently viewing the video, the audio communications may be very clear because visually engaged recipients can see the video which provides additional context. For example, visually engaged recipients do not need a description of the bedroom or of the dead body because they can see it. Visually engaged recipients would not need an explanation as to why the responder is moving to the adjoining room because they could see the blood trail leading to the adjoining room and that would explain why the responder is moving to the adjoining room. Thus, visually engaged recipients need only receive the original audio communications stream 230.

The same is not true for recipients who are not visually engaged 119. For example, although they would know the responder is in a bedroom, they would not know the condition of the room. Likewise, the statement that there is a dead body provides no indication of foul play or natural occurrence. The indication of moving to the adjacent room provides no indication as to why the movement is occurring.

In one implementation, the virtual assistant 120 monitors the audio communications stream and detects references in the audio communication stream to elements that were previously identified in the video and stored in the element description database 125 and generates a supplemented audio communications stream 235. For example, in audio communication 213, the virtual assistant 120 is monitoring the audio communications stream and may detect reference to the element "bedroom" which is one of the elements that was previously identified and stored in the element description database 125. As shown in Table 1, the generated description associated with the element bedroom is, "chair overturned, sign of struggle." The virtual assistant 120 may wait for a period of silence 240 in the audio communications stream 210, and then insert the generated description "chair overturned, sign of struggle" 245 into the supplemented audio communications stream 235. By utilizing text to speech technology, for example, the description can be relayed in an audible format for those recipients that are not visually engaged.

Likewise, in audio communication 217, the element "dead body" is present. In Table 1 it is shown that the description associated with "dead body" is "male, on floor, has blood stains." The virtual assistant may wait for a period of silence 250 in the responder audio communication stream 210 and insert the description "male, on floor, has blood stains" 255 into the supplemented audio communications stream 235. Likewise, when the reference to the element adjoin room is detected in communication 225, the virtual assistant may insert, during a period of silence 260, the generated description, "blood train leading to adjacent room" 265.

Recipients that are not visually engaged may receive the supplemented audio communications stream 270 which includes both the original audio communications stream 210 as well as the supplemented audio communications stream. As such, users who are not visually engaged will receive a supplemented audio communication stream that provides context that would otherwise be unavailable to recipients that are not visually engaged.

It should be understood that the above example implementation only provides the supplemented audio stream to recipients that are not visually engaged. Other implementations may provide the supplemented audio stream to all recipients. The example implementation also describes waiting for periods of silence to insert the supplemental audio, but the techniques described herein are not so limited. In some implementations, the virtual assistant may temporarily pause the responder audio communications stream 210 when a reference to an identified element is detected, insert the generated description, and then resume the audio communications stream.

Figure 3:
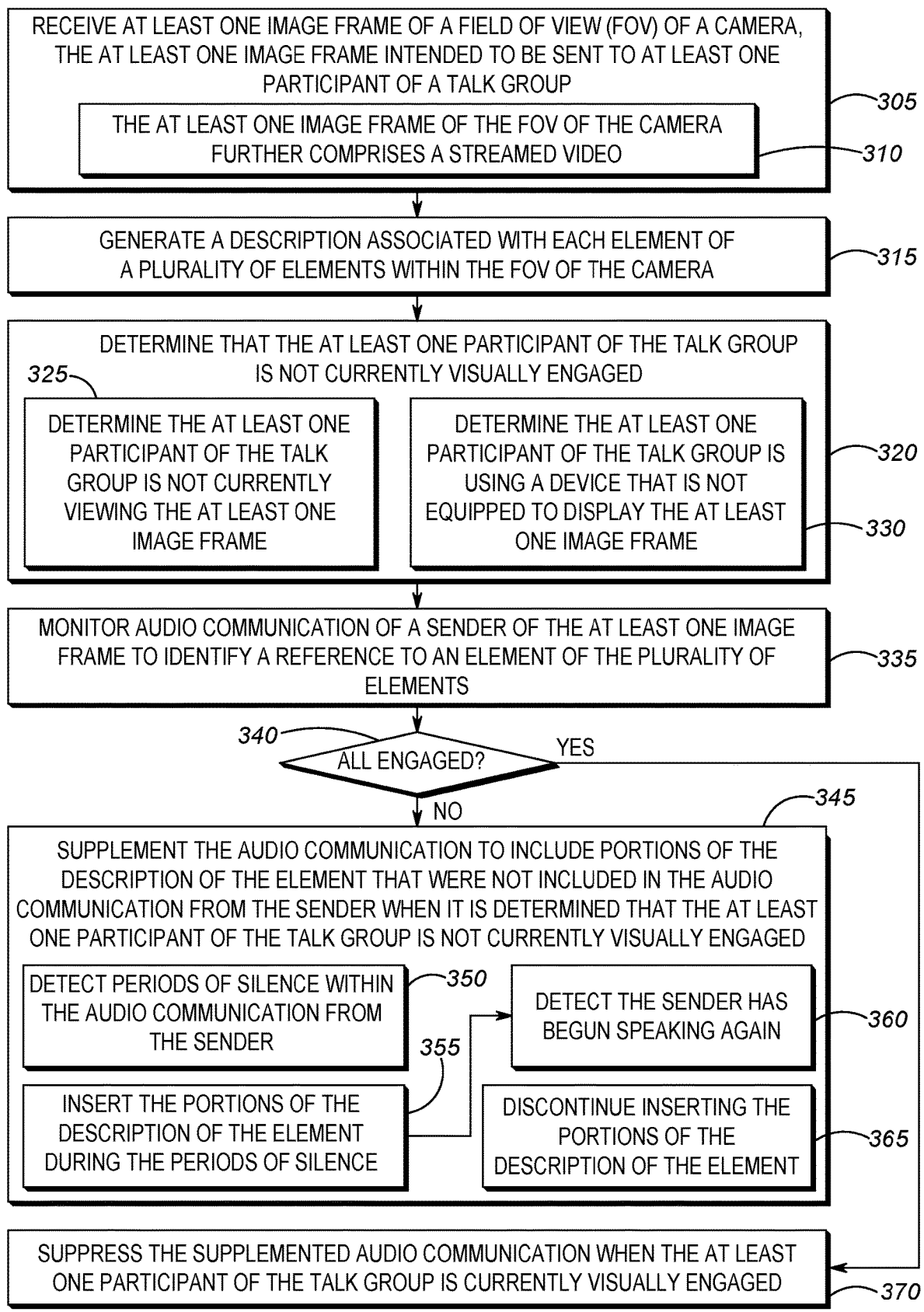
FIG. 3 is an example of a flow diagram of the virtual assistant providing situation commentary techniques described herein.

FIG. 3 is an example of a flow diagram of the virtual assistant providing situation commentary techniques described herein. In block 305, at least one image frame of a field of view (FOV) of a camera may be received. The at least one image frame may be intended to be sent to at least one participant of a talk group. As explained above, a responder may capture an image (or a series of images comprising a video) and wish to send the image to other members of a talk group. For example, the responder may wish to send a video of an incident scene so that his colleagues may be aware of what is going on at the incident scene, despite not being present at the incident scene.

As shown in block 310, in some cases, the at least one image frame of the FOV to the camera further comprises a streamed video. As explained above, the techniques described herein are not limited to still frame images only, and may also be utilized with motion video.

In block 315, a description associated with each element of a plurality of elements within the FOV of the camera may be generated. The techniques described herein may utilize any known technique for identifying elements and descriptions of those elements. For example, there are known object classifiers that may be utilized to detect the presence of an automobile in an image. Likewise, there are known techniques to identify license plate numbers (automatic license plate recognition), identify colors of vehicles, identify makes and models of vehicles, etc. Furthermore, there are known automated video description services available to automatically view an image, identify elements within the image, and generate descriptions of those elements. The techniques described herein are not dependent on the particular techniques used to identify image elements and generate descriptions of those elements.

In block 320, it may be determined that at least one participant of the talk group is not currently visually engaged. As explained above, being visually engaged means that the participant is actively looking at the image that is being sent to his communications device. There are different reasons why a participant may not be visually engaged. As shown in block 325, it may be determined that the at least one participant of the talk group is using a device that is not equipped to display the at least one image frame. As explained above, some users may have legacy devices that do not include display capabilities suitable to view the images being sent (e.g. audio only devices, text based displays, etc.). Users of such devices will never be able to view the image on their communications device and are thus considered not visually engaged.

As another example, in block 330, it may be determined that the at least one participant of the talk group is not currently viewing the at least one image frame. In other words, the participant's communication device may be capable of displaying the image, but the user is simply not looking at the image. This may be due to the participant being engaged in other activities that are occupying his visual processing resources. As mentioned above, there are many well-known techniques (e.g. eye gaze, etc.) that may be utilized to determine if a participant is currently viewing an image on his communications device.

In block 335, audio communication of a sender of the at least one image frame may be monitored to identify a reference to an element of the plurality of elements. In other words, as the sender of the image speaks to other members of the talk group, any reference to elements identified in block 315 may be identified.

In block 340, it may be determined if all participants in the talk group are visually engaged. If so, this means that all participants in the talk group are receiving the image, and there is no need to provide supplemented audio. The process moves to block 370, in which the supplemented audio communication is suppressed when the at least one participant of the talk group is currently visually engaged. The supplemented audio may still be generated, however it may not actually be sent to anyone. In alternate implementations, the supplemented audio may be sent to visually engaged participants as well.

In block 345, the audio communication may be supplemented to include portions of the description of the element that were not included in the audio communication from the sender when it is determined that the at least one participant of the talk group is not currently visually engaged. For example, when a reference to an element is identified in the audio communication, the generated description of that element may be included as supplemental audio. For example, the generated description may be sent through a text to speech converter to generate supplemental audio.

In block 350, periods of silence within the audio communication from the sender may be detected. In block 355 the portions of the description of the element may be inserted during the periods of silence. As explained above, in some implementations, the supplemental audio is only provided during periods of time that the sender is not speaking. However, it should be understood that in other implementations, the sender's audio may be buffered while the supplemental audio is inserted, and then continues to be output after the supplemental audio is finished.

In block 360, the sender having begun speaking again may be detected. In block 365, inserting the portions of the description of the element may be discontinued. In other words, once it is detected that the sender has begun speaking again, the output of the supplemental audio may stop. This may result in portions of the supplemental audio being cut off. In some implementations, this may be desirable as it may be assumed that live audio from the sender is more important than the insertion of supplemental audio.

Figure 4:
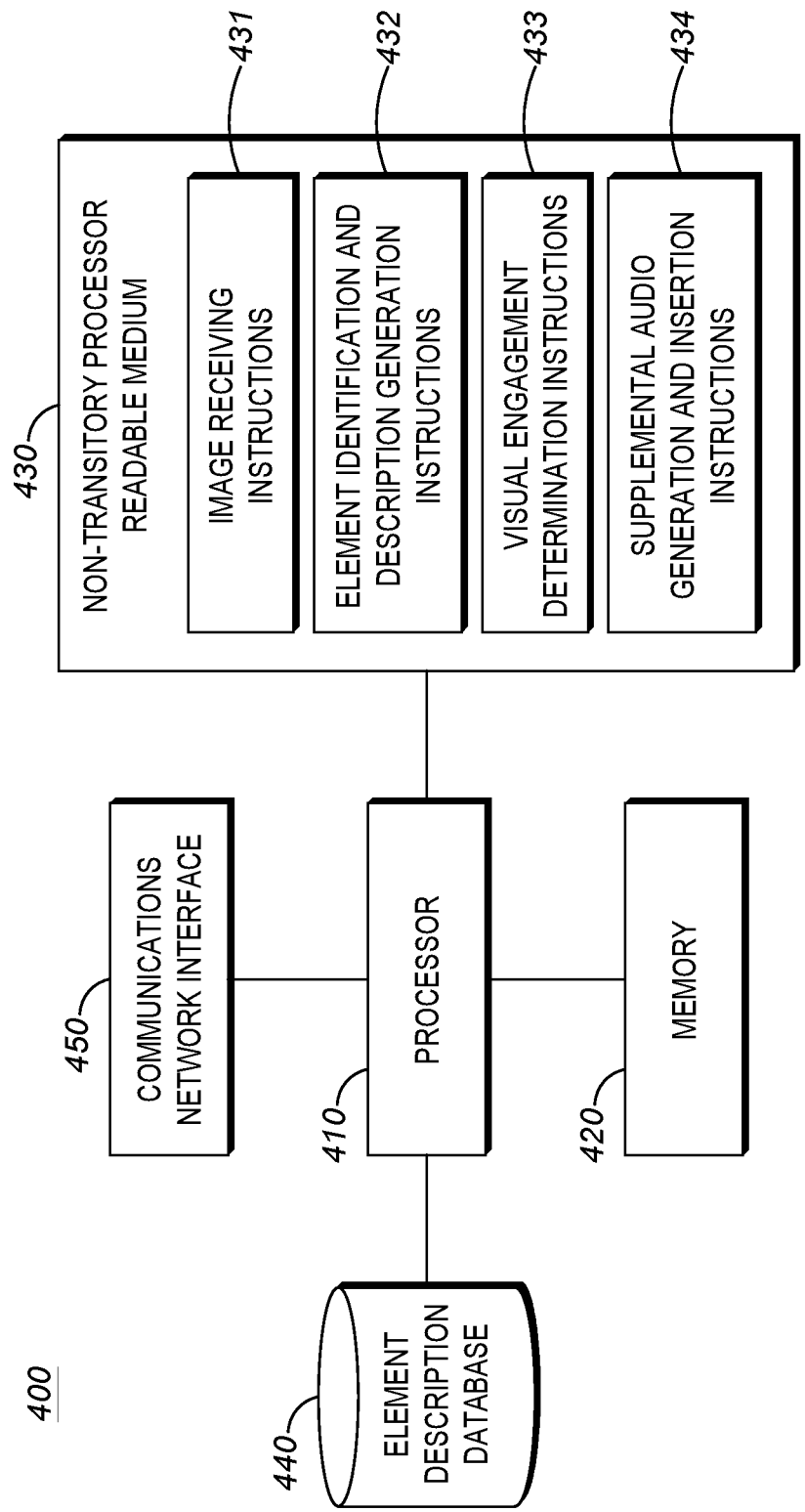
FIG. 4 is an example of a device that may implement the virtual assistant providing situation commentary techniques described herein.

FIG. 4 is an example of a device that may implement the virtual assistant providing situation commentary techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. virtual assistant instructions, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, element description database 440, and communications network interface 450.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include image receiving instructions 431. The image receiving instructions may cause the processor to receive an image from a responder's 110 communication device 111. The image may be received via network 150 by utilizing network interface 450. The network interface 450 may be any network interface that is compatible with network 150 and allows for communications between the communications device 111 and the device 400. The functionality provided by the image receiving instructions are described throughout the specification, including places such as blocks 305-310.

Medium 430 may include element identification and description generation instructions 432. The element identification and description generation instructions may be used to identify elements within the received image and generate descriptions of those elements. As mentioned above, the element identification and description generation instructions may utilize known techniques. The functionality provided by the element identification and description generation instructions are described throughout the specification, including places such as block 315. The element identification and description generation instructions may utilize element description database 440 to store the identified elements and the descriptions associated therewith. The element description database 440 may generally be the same as element description database 125.

Medium 430 may include visual engagement determination instructions 433 which may be used to determine which talk group participants are visually engaged. The determination may be based on the type of device in use or on if the user of the device is currently looking at the screen. The visual engagement determination instructions are described throughout the specification, including places such as blocks 320 and 340.

Medium 430 may also include supplemental audio generation and insertion instructions 434. The supplemental audio generation and insertion instructions may be utilized to identify references to elements within the image and insert generated supplemental audio based on the generated descriptions during periods of silence. The supplemental audio generation and insertion instructions are described throughout the specification, including places such as blocks 345-365 and 370.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving at least one image frame of a field of view (FOV) of a camera, the at least one image frame intended to be sent to at least one participant of a talk group;
   generating a description associated with each element of a plurality of elements within the FOV of the camera;
   determining that the at least one participant of the talk group is not currently visually engaged;
   monitoring audio communication of a sender of the at least one image frame to identify a reference to an element of the plurality of elements; and
   supplementing the audio communication to include portions of the description of the element that were not included in the audio communication from the sender when it is determined that the at least one participant of the talk group is not currently visually engaged.

2. The method of claim 1 wherein the at least one image frame of the FOV of the camera further comprises a streamed video.

3. The method of claim 1 wherein supplementing the audio further comprises:
   detecting periods of silence within the audio communication from the sender; and
   inserting the portions of the description of the element during the periods of silence.

4. The method of claim 3 further comprising:
   detecting the sender has begun speaking again; and
   discontinuing inserting the portions of the description of the element.

5. The method of claim 1 further comprising:
   suppressing the supplemented audio communication when the at least one participant of the talk group is currently visually engaged.

6. The method of claim 1 wherein determining that the at least one participant of the talk group is not currently visually engaged further comprises at least one of:
   determining the at least one participant of the talk group is using a device that is not equipped to display the at least one image frame; and
   determining the at least one participant of the talk group is not currently viewing the at least one image frame.

7. A system comprising:
   a processor; and
   a memory coupled to the processor, the memory containing a set of instructions thereon that when executed by the processor cause the processor to:
   receive at least one image frame of a field of view (FOV) of a camera, the at least one image frame intended to be sent to at least one participant of a talk group;
   generate a description associated with each element of a plurality of elements within the FOV of the camera;
   determine that the at least one participant of the talk group is not currently visually engaged;
   monitor audio communication of a sender of the at least one image frame to identify a reference to an element of the plurality of elements; and
   supplement the audio communication to include portions of the description of the element that were not included in the audio communication from the sender when it is determined that the at least one participant of the talk group is not currently visually engaged.

8. The system of claim 7 wherein the at least one image frame of the FOV of the camera further comprises a streamed video.

9. The system of claim 7 wherein the instructions to supplement the audio further comprises instructions to:
   detect periods of silence within the audio communication from the sender; and
   insert the portions of the description of the element during the periods of silence.

10. The system of claim 9 further comprising instructions to:
    detect the sender has begun speaking again; and
    discontinue inserting the portions of the description of the element.

11. The system of claim 7 further comprising instructions to:
    suppress the supplemented audio communication when the at least one participant of the talk group is currently visually engaged.

12. The system of claim 7 wherein the instructions to determine that the at least one participant of the talk group is not currently visually engaged further comprises at least one of instructions to:
    determine the at least one participant of the talk group is using a device that is not equipped to display the at least one image frame; and
    determine the at least one participant of the talk group is not currently viewing the at least one image frame.

13. A non-transitory processor readable medium containing a set of instructions thereon that when executed by a processor cause the processor to:
    receive at least one image frame of a field of view (FOV) of a camera, the at least one image frame intended to be sent to at least one participant of a talk group;
    generate a description associated with each element of a plurality of elements within the FOV of the camera;
    determine that the at least one participant of the talk group is not currently visually engaged;
    monitor audio communication of a sender of the at least one image frame to identify a reference to an element of the plurality of elements; and
    supplement the audio communication to include portions of the description of the element that were not included in the audio communication from the sender when it is determined that the at least one participant of the talk group is not currently visually engaged.

14. The medium of claim 13 wherein the at least one image frame of the FOV of the camera further comprises a streamed video.

15. The medium of claim 13 wherein the instructions to supplement the audio further comprises instructions to:
   detect periods of silence within the audio communication from the sender; and
   insert the portions of the description of the element during the periods of silence.

16. The medium of claim 15 further comprising instructions to:
   detect the sender has begun speaking again; and
   discontinue inserting the portions of the description of the element.

17. The medium of claim 13 further comprising instructions to:
   suppress the supplemented audio communication when the at least one participant of the talk group is currently visually engaged.

18. The medium of claim 13 wherein the instructions to determine that the at least one participant of the talk group is not currently visually engaged further comprises at least one of instructions to:
   determine the at least one participant of the talk group is using a device that is not equipped to display the at least one image frame; and
   determine the at least one participant of the talk group is not currently viewing the at least one image frame.

* * * * *